United States Patent [19]

Freese

[11] Patent Number: 4,629,354
[45] Date of Patent: Dec. 16, 1986

[54] TAPERED SHAFT RETENTION APPARATUS

[75] Inventor: John D. Freese, Washington, Ill.

[73] Assignee: Caterpillar Inc., Peoria, Ill.

[21] Appl. No.: 789,263

[22] Filed: Oct. 18, 1985

[51] Int. Cl.[4] .............................................. F16D 1/12
[52] U.S. Cl. ..................... 403/261; 403/259; 403/273; 403/16; 411/278; 29/447; 29/525
[58] Field of Search ............... 403/299, 273, 260, 259, 403/261, 344, 16, 11; 308/517, 518, 520; 411/276, 277, 278, 279; 29/446, 447, 526 R, 525

[56] References Cited

U.S. PATENT DOCUMENTS

| | | | |
|---|---|---|---|
| 2,472,742 | 6/1949 | Brown | 411/277 X |
| 3,019,039 | 1/1962 | Clavell | 403/273 X |
| 3,062,743 | 11/1962 | Kylen | 29/525 |
| 3,333,899 | 8/1967 | Christian | 403/261 X |
| 3,413,022 | 11/1968 | Waddell | 403/261 |
| 3,718,957 | 3/1973 | Shank | 29/447 X |
| 3,952,606 | 4/1976 | Schulz | 74/377 |
| 4,025,136 | 5/1977 | Gallendux | 308/207 |
| 4,033,394 | 7/1977 | Capuano | 411/278 |

FOREIGN PATENT DOCUMENTS 874674  5/1942  France .......................... 403/261

Primary Examiner—Thomas F. Callaghan
Assistant Examiner—Joseph A. Fischetti
Attorney, Agent, or Firm—Charles E. Lanchantin, Jr.

[57] ABSTRACT

A tapered shaft retention apparatus is used with a shaft having a shoulder, a cylindrical surface, a smooth conically tapered surface, and an annular member such as an inner race of a bearing assembly mounted on the cylindrical surface. A sleeve is mounted on the shaft with an adjustment nut screwthreadably mounted thereon, and an internally tapered hub is mounted on the tapered surface in abutment with the nut with a preselected press fit. This assures the transmission of torque through the hub and positions the bearing assembly on the shaft. During assembly the hub is initially installed at an ambient temperature and the adjustment nut set at a preselected clearance therefrom, the hub is then removed and thermally expanded and reinstalled in abutment with the nut to establish the desired press fit.

7 Claims, 4 Drawing Figures

TAPERED SHAFT RETENTION APPARATUS

DESCRIPTION

1. Technical Field

This invention relates to a retention apparatus for transmitting torque from a hub to a tapered shaft, and more particularly for transmitting such torque without positive keying therebetween while maintaining an annular member in a preselected location on the shaft.

2. Background Art

Rather than using an expensive spline connection, smooth conically tapered surfaces on shafts are used in many power train devices in order to hold an internally tapered hub thereon. In most cases the hub is thermally expanded and pushed on to the tapered surface during assembly until it abuts a shoulder, or until it reaches an axially inwardly disposed scribed mark on the shaft, or until a preselected force level is reached on a ram. But, such earlier power train devices have either not been able to positively maintain the desired preselected press fit of the hub on the conical taper under ambient conditions, or have required overly precise machining of the parts at extra expense.

Still other devices have undesirably used locks or keys on the smooth tapered shaft to more positively secure the hub thereto.

Furthermore, such power train devices typically used an adjustment nut for maintaining an annular member such as the inner race of a bearing assembly or a gear in a predetermined axial position on the shaft, and a completely axially separated apparatus for retaining the hub on the tapered shaft.

Accordingly, what is needed is a structurally simple and rugged retention apparatus and associated method which will not only allow the transmission of torque from a hub to a smooth tapered shaft without positive keying, but will assure that a preselected press fit is obtained while simultaneously maintaining an annular member that is mounted on the shaft in a preselected axial location.

DISCLOSURE OF THE INVENTION

The present invention is directed to overcoming one or more of the above problems.

In one aspect of the invention there is provided a retention apparatus for a tapered shaft having an inner shoulder, cylindrical surface means, and a smooth outer conically tapered surface, with an annular member and a sleeve mounted on the cylindrical surface means. An adjustment nut is screwthreadably mounted on the sleeve, and an internally tapered hub is mounted on the conically tapered surface in abutment with the nut with a preselected press fit for transmitting torque directly to the shaft while maintaining the sleeve in a position retaining the annular member in a preselected axial location relative to the shoulder.

In another aspect of the invention there is provided a method of retaining an internally tapered hub on a shaft and of retaining an annular member in a preselected location relative to a shoulder on the shaft, with the shaft defining cylindrical surface means supporting the annular member and a conically tapered surface. The method includes the steps of: placing a sleeve on the cylindrical surface means with an adjustment nut screwthreadably mounted thereon in an inward location; mounting the hub on the conically tapered surface of the shaft at an ambient temperature; moving the nut outwardly and establishing a preselected distance between the nut and the hub; removing the hub from the shaft; heating the hub to expand it; and urging the hub onto the conically tapered surface of the shaft until it abuts the nut and maintains the sleeve in a holding position with respect to the annular member.

Thus, the problem of maintaining a preselected press fit of a hub on the conically tapered surface of the shaft without overly precise dimensional control is solved by use of a sleeve and adjustment nut for clamping at least one annular member such as the inner race of a bearing assembly or gear and any operatively associated element axially against a shoulder of the shaft. By preassembling the hub on the shaft at an ambient or room temperature state, the initial match-up of the parts is conveniently obtained, and the adjustment nut can be set to accurately limit the further axially inward disposition of the reinstalled hub after it has been heated and expanded to an equivalent press fit condition.

BEST MODE FOR CARRYING OUT THE INVENTION

Figure 1:
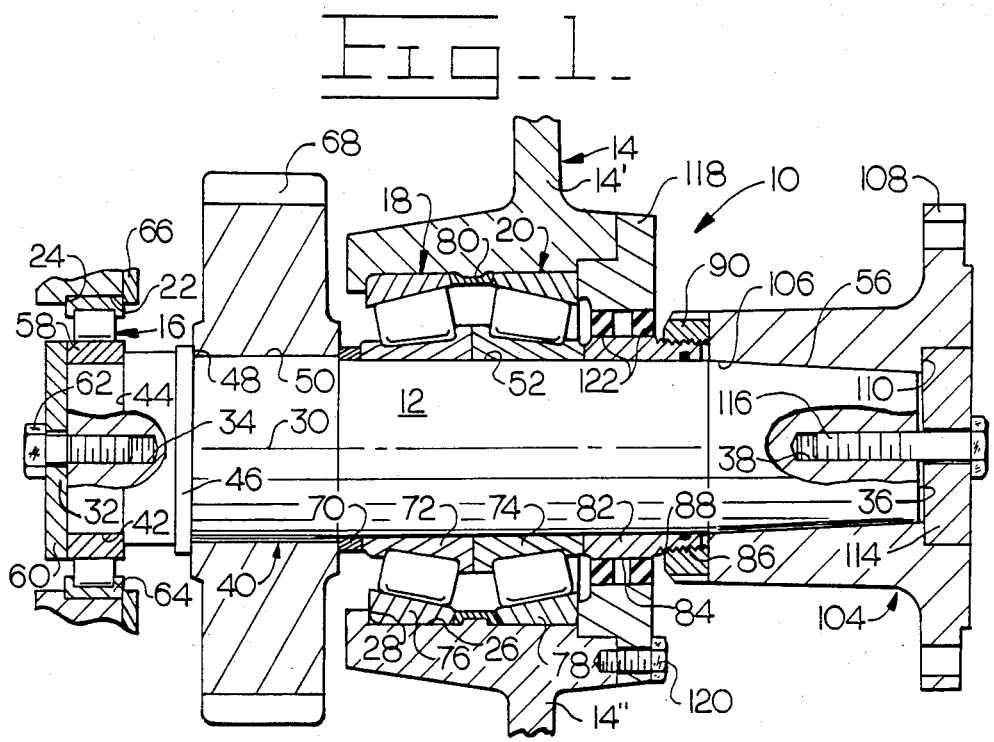
FIG. 1 is a diagrammatic, generally sectionalized view of a tapered shaft retention apparatus constructed in accordance with the present invention as rotatably mounted in, for example, a fragmentary portion of a transmission case.

Referring to FIG. 1, there is shown an exemplary tapered shaft retention apparatus 10 including an input shaft 12 which is rotatably mounted in a supporting case 14 by an inner straight roller bearing assembly 16 and an outer pair of opposing tapered roller bearing assemblies 18 and 20. The case defines a first inner cylindrical bore 22 and juxtaposed shoulder 24 and a second outer cylindrical bore 26 and juxtaposed shoulder 28, and is preferably split or formed into two major parts 14' and 14" along a plane containing the central axis 30 of the shaft, although not shown.

The shaft 12 has an inner end face 32 and a threaded bore 34 on the left side when viewing FIG. 1, and an outer end face 36 and a threaded bore 38 on the right side. Also, reading from left to right, the shaft defines cylindrical surface means 40 thereon including an inner bearing seat 42 and associated axially inwardly facing shoulder 44, a flange 46 defining an outwardly facing shoulder 48, a gear mounting seat 50, and a bearing and sleeve mounting seat 52. Lastly, a smooth conically tapered surface 56 having a 10:1 taper is defined by the shaft at the outer end thereof.

The inner roller bearing assembly 16 includes an inner race 58 mounted on the shaft seat 42, and this inner race is urged against the shoulder 44 and positively held in place by a retaining plate 60 connected to the shaft end face 32 by a fastener or bolt 62 screwthreadably secured in the bore 34. The bearing assembly also has an outer race 64 mounted in the case bore 22 and similarly urged against the shoulder 24 by a retaining plate 66 releasably secured to the case.

An output gear 68 is mounted on the cylindrical shaft seat 50 against the shoulder 48 with a preselected or standard diametrical press fit therebetween, for example 0.13 mm (0.005"). A spacer ring 70 is mounted on the bearing seat 52 adjacent the gear, and the back-to-back inner races 72,74 of the tapered roller bearing assemblies 18 and 20 respectively, are also mounted on the bearing seat 52 in stacked relation with the spacer ring and preferably with a lighter diametrical press fit than that of the gear. An outer race 76 of the roller bearing assembly 18 is mounted in the bore 26 of the supporting case 14 against the shoulder 28, and an outer race 78 of the other roller bearing assembly 20 is also mounted in that bore but separated therefrom by a spacer ring 80.

Figure 2:
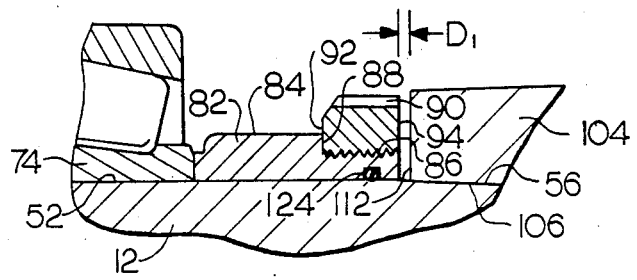
FIG. 2 is an enlarged, fragmentary sectionalized view of a portion of FIG. 1 showing certain elements installed in a preliminary stage of assembly.
Figure 4:
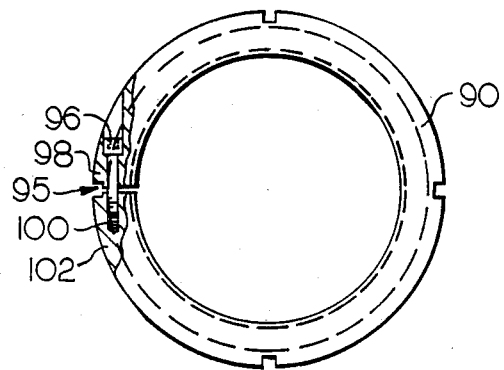
FIG. 4 is a diagrammatic side view of the exemplary adjustment nut illustrated in FIGS. 1–3.

As shown also in FIG. 2, the tapered shaft retention apparatus 10 includes a sleeve 82 mounted on the seat 52 of the input shaft 12 in juxtaposed relation to the inner race 74. The sleeve defines a cylindrical seal contact surface 84, and a reduced diameter externally threaded surface 86 separated by an outwardly facing shoulder 88. An internally threaded adjustment nut 90 having an inner end face 92 and an outer end face 94 is screwthreadably received on the threaded surface 86 of the sleeve. As best shown in FIG. 4, the adjustment nut 90 of the instant embodiment has a radially split joint 95 in order to allow it to be positively secured in place on the sleeve in any axial position. This is accomplished by manual tightening of a fastener such as a hex socket head bolt 96 which extends through a first flange 98 thereof and is screwthreadably received in a threaded bore 100 in a second flange 102 thereof.

In use, a hub 104 having a smooth, internally, conically tapered surface 106, an outer mounting flange 108, and a counterbore 110 is mounted on the tapered surface 56 of the shaft. Also, the hub has an inner end face 112 which is adapted to abut the outer end face 94 of the nut 90 in the fully installed condition. It is positively retained in place by a retaining plate 114 seated in the hub counterbore 110 by a fastener or bolt 116 extending through the retaining plate and received in the threaded bore 38.

Another retaining member 118 is releasably secured to the case 14 by a plurality of fasteners or bolts 120, and this retaining member is adapted to contact the outer race 78 and urge the spacer ring 80 and other outer race 76 against the shoulder 28. A pair of axially spaced apart seal assemblies 122 are mounted positively within the retaining member 118 and are adapted to engage the seal contact surface 84 on the sleeve 82. Another seal ring 124 is mounted within the sleeve to insure the absence of leakage of lubrication fluid outwardly between the sleeve and the shaft 12.

INDUSTRIAL APPLICABILITY

In operation, the input hub 104 is connected to be driven at engine speed, and thus the shaft 12 and output gear 68 rotate about the central axis 30 at such speed within the case 14. Full engine torque is advantageously transmitted from the hub to the shaft via the interacting conically tapered surfaces 56 and 106 and specifically the preselected press fit between them. In this regard, the term "preselected press fit" means that at any one axial location the internal diameter of the surface 106 is smaller than the external diameter of the surface 56 at an ambient temperature of both, and does not imply that the associated parts are pressed axially together while exhibiting such interference fits since the outer part can be thermally expanded to aid such assembly.

Figure 3:
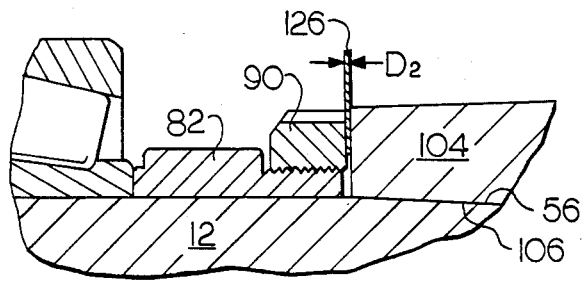
FIG. 3 is a view similar to FIG. 2 only showing the elements in a subsequent stage of assembly.

During assembly of the instant tapered shaft retention apparatus 10, the following sequential steps are preferably utilized:

Step (a) the gear 68 is heated and mounted upon the cylindrical seat 50 of the shaft 12 and against the shoulder 48 thereof while thermally expanded, and then allowed to cool to provide the equivalent of a standard press fit joint therebetween;

Step (b) the spacer 70 is inserted over the seat 52, the roller bearing assemblies 18 and 20 are heated and thermally expanded and axially located with the spacer ring 80 on to the seat 52, and the sleeve 82, the retainer member 118 and associated seal assemblies 122 are mounted over the seat 52, which seat is preferably slightly smaller in diameter than the seat 50 for ease of installation of the gear;

Step (c) the adjustment nut 90 is screwthreadably installed on the threaded surface 86 of the sleeve 82 and into abutment with the shoulder 88 as is shown in FIG. 2;

Step (d) internal surface 106 of the hub 104 is preferably colored blue and then the hub is mounted at an ambient temperature on the conically tapered surface 56 of the shaft by light tapping with a hammer or the like and this defines a first axial clearance distance "$D_1$" between the inner end face 112 of the hub and the outer end face 94 of the adjustment nut 90 as is indicated in FIG. 2;

Step (e) the nut is thereafter screwthreadably adjusted axially outwardly until a second and smaller axial clearance distance "$D_2$" is achieved therebetween as is indicated in FIG. 3 with a preselected feeler gauge 126 preferably being used to establish such gap;

Step (f) the adjustment nut 90 is positively locked in place by screwthreadably tightening the bolt 96 illustrated in FIG. 4 and thereby closing the joint 95 and clamping the nut on the threaded surface 86;

Step (g) the hub is subsequently removed from the shaft and the conically tapered shaft surface 56 inspected visually to assure that a preselected portion of the area thereof, for example 50%, has been colored blue from exposure to the colored internal surface 106 of the hub;

Step (h) the hub is heated to thermally expand the internal tapered surface 106 thereof;

Step (i) the hub is reinstalled while hot onto the tapered surface 56 of the shaft until the inner end face 112 thereof abuts the outer end face 94 of the nut, and is allowed to cool;

Step (j) after the hub has cooled down to approximately ambient temperature the adjustment nut 90 is unlocked by loosening the bolt 96 and the joint 95 opened, and then the nut is threaded axially outwardly to take up any clearance between the surfaces 94 and 112 caused by thermal contraction of the hub, and this maintains the sleeve 82 in a holding position with respect to the bearing assembly 20 as is shown in FIG. 1;

Step (k) the retaining plate 114 is connected to the shaft by the screwthreaded installation of the bolt 116 into the shaft, and the retaining plate urged against the hub counterbore 110 to assure that the hub is held against the nut.

Assuming that the surfaces 56 and 106 have a 10:1 taper and that the feeler gauge 126 has a thickness of 1.27 mm (0.050"), then the equivalent of a 0.13 mm (0.005") diametrical press fit is obtained of the hub 104 on the shaft 12 using the aforementioned method.

In the event that less than 50% of the area of conically tapered shaft surface 56 has been colored blue in aforementioned Step (g) of the assembly, this is indicative that the mating tapered parts have not been made to proper specifications or that the necessary assembly procedures were not correctly followed. Precise measurements of the parts can be taken to see if either the shaft 12 or the hub 104 is defective, and the assembly procedure repeated if the parts are within specifications.

In the instant embodiment, the remaining roller bearing assembly 16 is installed on the inner end of the shaft 12 in a conventional manner, and then the preassembled shaft can be placed between the semicylindrical portions of hoses 22 and 26 in the separable case portions 14' and 14" and the case portions secured together by any conventional fastening technique.

In view of the foregoing, it is apparent that the tapered shaft retention apparatus 10 can provide the equivalent of a preselected diametrical press fit between the smooth, conically tapered surfaces of a hub and a shaft in order to positively transmit torque therebetween while simultaneously positioning at least one annular member such as the inner bearing race 74 or the gear 68 on the cylindrical surface of the shaft in a positive location relative to a shoulder on the shaft despite a relatively wide variation in dimensional tolerances of the various elements. Moreover, the associated method of assembling the elements is simple and positive.

Other aspects, objects and advantages of this invention can be obtained from a study of the drawings, the disclosure and the appended claims.

I claim:

1. In a tapered shaft retention apparatus of the type including a shaft having an inner shoulder, cylindrical surface means, a smooth outer conically tapered surface, and an annular member mounted on the cylindrical surface means, the improvement comprising:
   a sleeve mounted on the cylindrical surface means in abutment with the annular member;
   an adjustment nut screwthreadably mounted on the sleeve; and
   an internally tapered hub mounted on the conically tapered surface with a preselected press fit for transmitting torque directly between the hub and the shaft, the nut being in abutment with the hub, and the nut and sleeve being screwthreadably adjusted in axial length to retain the annular member in a preselected axial location relative to the shoulder.

2. The tapered shaft retention apparatus of claim 1 wherein the tapered surface of the shaft is free of positive drive keying with the hub.

3. The tapered shaft retention apparatus of claim 1 including a gear mounted on the cylindrical surface means with a preselected press fit in a preselected axial location between the shoulder on the shaft and the annular member.

4. The tapered shaft retention apparatus of claim 1 wherein the annular member is an inner race of a bearing assembly.

5. In a tapered shaft retention apparatus of the type including a shaft having an inner shoulder, cylindrical surface means, a smooth outer conically tapered surface, and an annular member mounted on the cylindrical surface means, the improvement comprising:
   an internally tapered hub mounted on the conically tapered surface with a preselected fit for transmitting torque between the shaft and the hub free of positive drive keying therebetween; and
   adjustment means for maintaining the annular member in a preselected axial location between the shoulder and the hub, the adjustment means including a sleeve mounted on the cylindrical surface means in abutment with the annular member and an adjustment nut screwthreadably connected to the sleeve in abutment with the hub.

6. The tapered shaft retention apparatus of claim 5 including a gear mounted on the cylindrical surface means between the shoulder and the annular member.

7. The tapered shaft retention apparatus of claim 6 wherein the annular member is a bearing race.

* * * * *